3,365,935
SOUND DETECTING TEST APPARATUS
Hubert J. Kane, 20 Baker Lane, Andover, Mass. 01810
Continuation-in-part of application Ser. No. 344,714, Feb. 13, 1964. This application Oct. 13, 1966, Ser. No. 586,416
10 Claims. (Cl. 73—71.4)

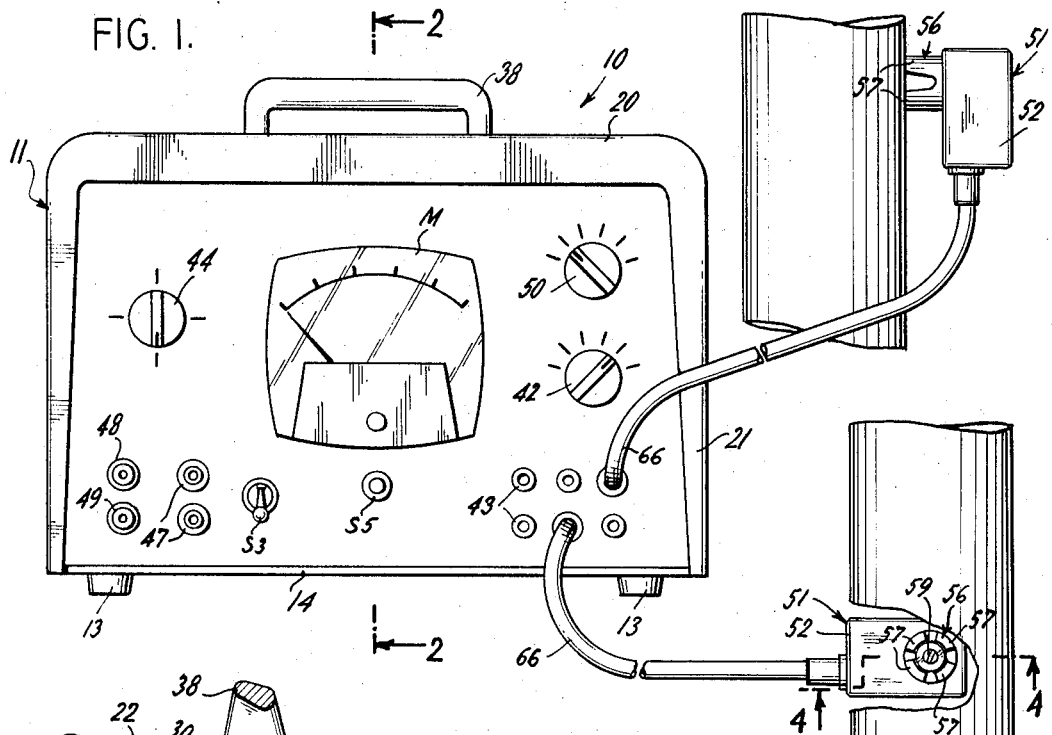
Jan. 30, 1968     H. J. KANE     3,365,935
SOUND DETECTING TEST APPARATUS
Filed Oct. 13, 1966     2 Sheets-Sheet 1
INVENTOR.
HUBERT J. KANE
BY Edward F. Levy
ATTORNEY Jan. 30, 1968 H. J. KANE 3,365,935
SOUND DETECTING TEST APPARATUS
Filed Oct. 13, 1966 2 Sheets-Sheet 2
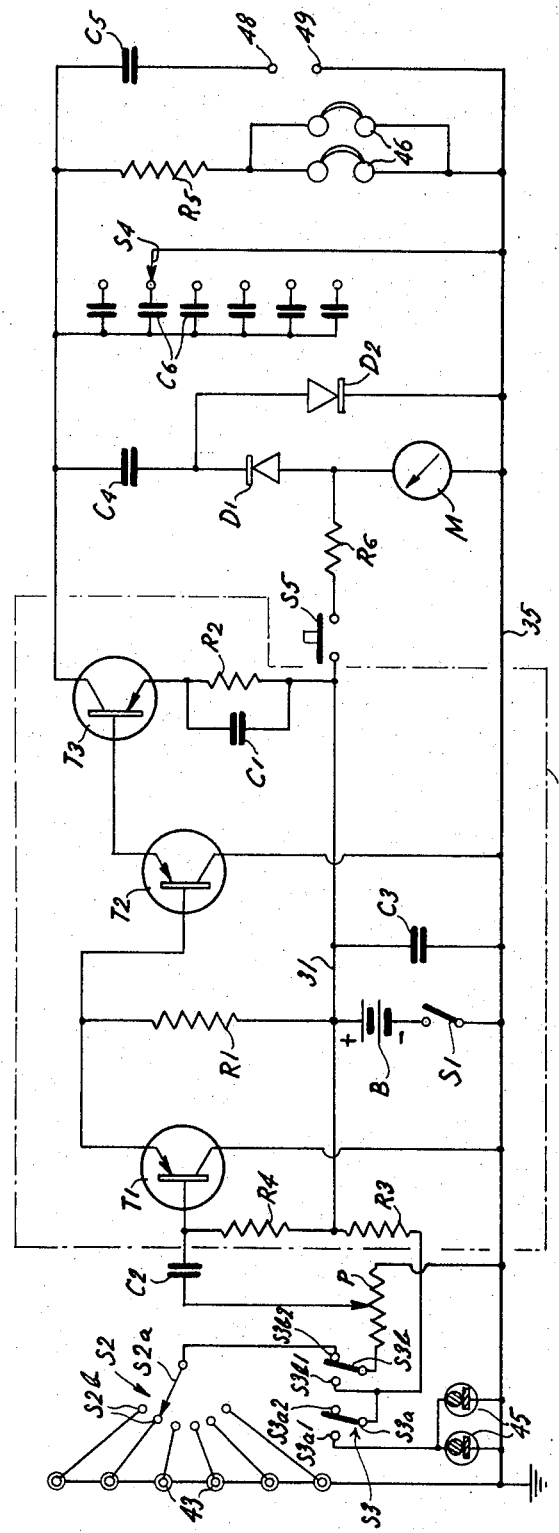
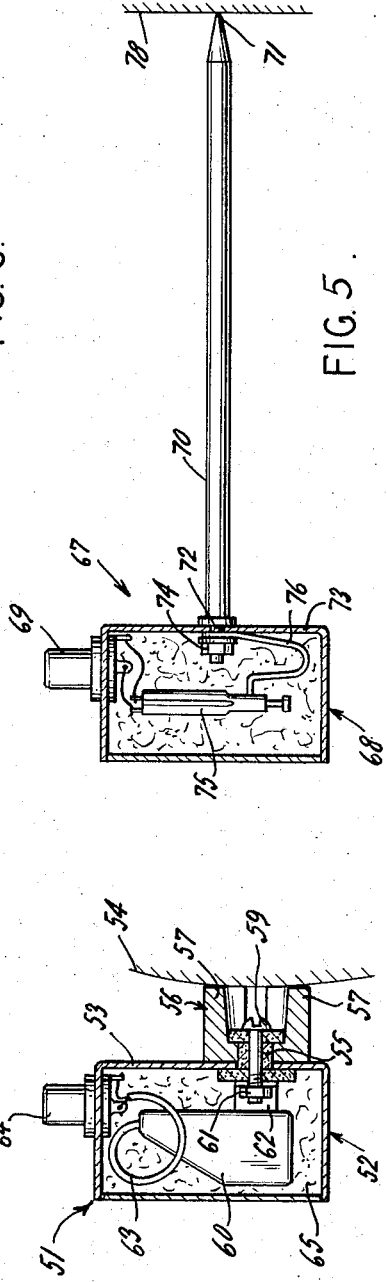
INVENTOR.
HUBERT J. KANE
BY
Edward F. Levy
ATTORNEY

# United States Patent Office 3,365,935
Patented Jan. 30, 1968

This application contains subject matter identical to that disclosed in my co-pending U.S. patent application Serial No. 344,714 filed February 13, 1964, and now abandoned and constitutes a continuation-in-part thereof.

The present invention relates generally to improvements in test apparatus and it relates particularly to an improved device for identifying and locating defects and sources of malfunctioning of equipment possessing enclosed moving parts or moving media by the sonic examination and survey thereof.

In industry many forms of equipment are employed which contain numerous enclosed moving parts and moving media. Typical of this equipment are internal combustion engines such as diesel engines, gasoline engines and other prime movers, hydraulic and pneumatic systems and the like. Under normal operating conditions equipment of the above type generate a sound pattern of a tone, quality and intensity which is characteristic of the particular piece of equipment. Any significant variance from this characteristic sound pattern generally indicates a malfunctioning and defect in the equipment and such a variance is often easily recognizable by an operator or attendant who is familiar with the equipment's operation. However, while the malfunctioning is readily apparent, the cause of such malfunctioning is frequently difficult to isolate and identify even by the expert. While a deviation from the normal frequency distribution and intensity of the sound pattern generated by the overall equipment is an index of its malfunctioning, such as caused by a worn or defective part, a misadjustment, the presence of a contaminent or deleterious deposit or a defect in a moving medium, this deviation, as such, does not identify the precise locus or source of the malfunctioning. Since the operating equipment generally generates many sounds of various natures at different parts of the equipment and these parts are in good mechanical sound communication, such individual sounds are merged into a common pattern so that difficulty is encountered in isolating particular sounds and identifying them as to their sources, and in assigning a change in the overall sound pattern to a specific area.

Many devices and procedures have been employed and proposed for examining the sound pattern of equipment in diagnosing any malfunctioning thereof. However, these devices and procedures possess many drawbacks and disadvantages. It has been a common expedient to use a stethoscope in an attempt to identify and isolate abnormal operating sounds as an indication of a defect in equipment. While such expedient has some applications, its use is highly limited since, although it permits improved sound resolution, it merely presents the sound pattern of the overall machine. It has been discovered that a closed comparison of the sound patterns, occurring substantially simultaneously or in closely spaced relationship at different parts of the equipment under test, provides extremely valuable data in connection with the locus or cause of a malfunctioning and usually permits the inspector to promptly isolate the defect. The frequency distribution and intensity of the sound pattern enters into comparison and such comparison may be audibly effected such as by the use of listening devices or visually by means of sound level meters or oscilloscopes in accordance with the procedure afforded by the present invention.

It is, therefore, a principal object of the present invention to provide an improved test apparatus.

Another object of the present invention is to provide an improved apparatus for detecting the cause of a malfunction in equipment containing numerous enclosed moving parts or moving media.

Still another object of the present invention is to provide an improved apparatus for effecting a comparison of the sound patterns at different sections of enclosed moving part equipment as a guide to the cause or locus of any malfunctioning of the operating equipment.

A further object of the present invention is to provide an improved apparatus for analyzing the operation of an internal combustion engine.

Still a further object of the present invention is to provide an improved apparatus of the above nature characterized by its ruggedness, compactness, convenience, versatility and ease of operation.

In a sense the present invention contemplates the provision of a test apparatus comprising an audio amplifier including an input and an output, a plurality of remotely located audio pickups, a coupling device affixed to each of said pickups for releasably mounting said pickups to equipment under test, means including a switch for alternatively coupling selected individual pickups to said amplifier input, and a transducer coupled to the output of said audio amplifier.

According to a preferred form of the present apparatus, there is provided a portable case in which the amplifier and other components are housed and which is provided with a rear door providing access to a storage space within the case. The front or face panel of the case carries a multicontact rotary switch and a plurality of first sockets selectively alternatively connected by way of the rotary switch to the amplifier input. Each of the audio pickups include a permanent magnet for releasably mounting the pickup to different parts of the equipment under test and a coupling cable terminating in a plug engaging one of the respective first sockets. Also mounted on the face panel is a current meter connected across the amplifier output through a capacitor and rectifier. Second sockets are located on the face panel and connected to the amplifier output and earphones are coupled to these sockets. There is provided a microphone and a switching arrangement for selectively connecting the microphone or a pickup unit to the amplifier input permitting its selective use as an intercommunication system. In addition there are included a volume control network and a tone control network including adjusting knobs located in the face panels, and amplifier output terminals permitting the connection of an oscilloscope or recording device.

Additional objects and advantages of the invention will become apparent during the course of the following specification when taken in conjunction with the accompanying drawing, in which:

FIG. 1 is a front elevational view of an apparatus embodying the present invention with a pair of audio pickups shown coupled thereto and attached to different portions of a hydraulic system, which is shown fragmentarily;

FIG. 2 is a sectional view taken along line 2—2 of FIG. 1 with the rear lid shown in partially open condition;

FIG. 3 is a view similar to FIG. 2, the apparatus being shown in a partially disassembled condition;

FIG. 4 is an enlarged section view taken along line 4—4 of FIG. 1;

FIG. 5 is an elevational view, partially broken away, of another form of pickup member employed in the present apparatus and FIG. 6 is a schematic diagram of the circuit network of the present apparatus.

Referring now to the drawings which illustrate a preferred embodiment of the present invention, the reference numeral 10 generally designates the improved apparatus which includes a portable casing 11 which houses the circuit network forming part of the apparatus and provides an easily accessible storage space for the various apparatus accessories. The casing 11 comprises a rectangular bottom wall 12 provided with foot pieces 13 depending from the corners thereof and having a vertical lip 14 along its front edge and an upwardly rearwardly directed flange 16 along its rear edge. Affixed to the top face of the bottom wall 12 immediately rearward of the lip 14 is a transversely extending angle member 17 having a vertical leg delineating with the lip 14, a transverse locking groove. Trapezoidal vertical side walls 18 are disposed along the side edges of the bottom wall 12 and have forwardly upwardly inclined rear edges.

Extending between the upper edges of and integrally formed with the side walls 18 is a forwardly upwardly inclined top wall 19, the forward edge of which terminates in a rearwardly downwardly inclined bezel defining flange 20 which joins inwardly rearwardly inclined bezel flanges 21 formed along the front edges of the side walls 18. A transversely extending angle member 22 is affixed to the underface of the top wall 19 and includes a depending leg spaced shortly rearwardly of the free edge of the bezel flange 20 and directed toward the vertical leg of the angle member 17. The assembly of the bottom wall 12 to the side walls 18 is effected by the provision of a pair of angle members 23 affixed to the inner lower borders of the side walls 18 and a pair of angle members 24 affixed to the inner rear borders thereof, the angle members 23 and 24 having inwardly directed legs adjacent the corresponding edges of the walls 18. The bottom wall 12 is secured by screws to the angle members 23 and the flange 16 is secured by screws to the lower sections of the angle members 24.

A rectangular intermediate panel 26 extends between the casing top and bottom walls 19 and 12 and divides the casing into a rear storage area 28 and a front circuit and component housing area 29. The upper border of the intermediate panel 26 engages the depending leg of a transversely extending angle member 30 affixed to the under face of the top wall 19. Projecting forwardly of and affixed to the side borders of the intermediate panel 26 are a pair of opposite guide channels 32 having front flanges 33 in alignment with the vertical legs of the angle members 17 and 22 and closely spaced rearwardly of the free edges of the bezel flanges 21. Access to the storage space 28 is provided through a door 34 hinged along its lower edge to the upper edge of the flange 16 and swingable between a closed position registering with the rear opening to the storage space 28 and in engagement with the angle members 24, and an open position. A permanent magnet latch 36 is affixed to the bottom rear border of the top wall 19 and engages the upper border of the door 34 when the latter is in its closed position to releasably maintain the door 34 in such closed position. The door 34 is formed of a magnetically-permeable material, such as steel. A handle 37 is affixed to the upper outer face of the door 34 to permit the opening and closing thereof and a handle 38 is affixed to the upper face of the top wall 19 to facilitate the carrying of the apparatus 10.

The various electrical components of the test apparatus are mounted on a rectagular front wall or face panel 39, the upper border of which is entrapped between the angle member 22 and the free edge of the bezel flange 20, the side borders of which are disposed between the channel legs 33 and the free edges of the bezel flanges 21 and the bottom border of which is entrapped between the angle member 17 and the lip 14. The method of assembling the casing 11 is clear from a view of FIGS. 2 and 3 of the drawings. A power supply battery B is releasably supported on the rear face of the intermediate panel 26 by a bracket 40.

The electrical network forming part of the present apparatus includes a three stage DC coupled wide band transistor amplifier 41 powered by the battery B and comprising three transistors T1, T2 and T3 respectively. The positive terminal of the battery B is connected to a positive line 31 and the negative terminal is connected through a switch S1 to a grounded negative line 35. The collector of the input transistor T1 is grounded and the emitter thereof is connected to the positive line 31 through a resistor R1 and to the base of the transistor T2. The collector of the transistor T2 is grounded and its emitter is connected to the base of the transistor T3. The emitter of the transistor T3 is connected to the positive line 31 through a resistor R2 shunted by capacitor C1.

In order to selectively alternatively couple one of a plurality of analyzing audio pickups or a microphone to the input of the amplifier 41 as defined by the base of the transistor T1, there is provided a multicontact rotary selector switch S2 and a double pole double throw switch S3, which switches are mounted on the face panel 39, the switch S2 being controlled by a panel mounted knob 42. Also mounted on the face panel 39 are a plurality of first socket members 43 each having a grounded outer terminal and an inner terminal connected to a respective contact $S2b$ of the switch S2. The switch S3 includes a pair of ganged switch arms $S3a$ and $S3b$ each cooperating with a corresponding pair of contacts $S3a1$ and $S3a2$, and $S3b1$ and $S3b2$ respectively. The switch contact $S3a1$ is connected through one or more microphones 45, preferably carbon microphones, to ground by way of suitable coupling cords and plug and jack arrangements and the switch contact $S3b1$ and the switch arm $S3a$ are connected through a common resistor R3 to the positive line 31. The switch contact $S3b2$ is connected to the selector arm $S2a$ of the switch S2 and the switch arm $S3b$ is connected through the resistance element of a volume control potentiometer P to ground. The control arm of potentiometer P is connected through a blocking capacitor C2 to the base of the transistor T1 which base, in turn, is connected through a resistor R4 to the positive line 31. The battery switch S1 is ganged with the potentiometer P in the usual manner and both are controlled by a face plate mounted knob 44. The positive line 31 is connected through a capacitor C3 to ground.

The output of the amplifier 41 and specifically the collector of the transistor T3 is connected to ground through a resistor R5 connected in series with one or more parallel connected earphones 46. The earphones 46 are coupled into the circuit, as aforesaid, by means of one or more corresponding face panel mounted socket members 47 and mating plugs connected to the earphones 46, the socket members 47 being connected in parallel between the resistor R5 and ground. A sound level current meter M has one of its terminals connected to ground and its other terminal connected in series with a first diode rectifier D1 and a blocking capacitor C4 to the collector of the transistor T3. A second rectifier diode D2 oriented oppositely to the diode D1 grounds the junction point of the diode D1 and capacitor C4. A pair of binding posts 48 and 49 respectively are mounted on the face plate 39, the binding post 49 being grounded and the binding post 48 being connected through a blocking capacitor C5 to the collector of the transistor T3. The binding posts 48 and 49 may be selectively connected to an oscilloscope, a recording oscillograph or other desirable visual signal indicating or recording device.

A tone control network is associated with the output of the amplifier 41 and includes a multicontact rotary selector switch S4, the selector arm of which is grounded and the contact elements of which are respectively connected to the terminals of a group of filter capacitors C6 of successively larger capacitance. The other terminals of the capacitors C6 are connected to the transistor T3 collector. The selector switch S4 is controlled by a knob 50 on the face panel 39. In order to test the adequacy of the battery B, a normally open push button switch S5 is mounted on the face panel 39 and is connected in series with a multiplier resistor R6 between the positive line 31 and the ungrounded terminal of the meter M. Closing of the switch S5 will cause a full sweep of the pointer on meter M, indicating that the battery B is active.

Referring to FIGS. 1 and 4 of the drawings in which is illustrated one of a plurality of audio pickup members which form part of the present apparatus, the reference numeral 51 designates the novel pickup which includes a rectangular housing 52 having a bottom wall 53. The means for releasably attaching the pickup 51 to a magnetically-permeable section 54 of the equipment under test comprises a strong permanent magnet 56 formed of Alnico, a ceramic magnetic material or the like. The magnet 56 is formed with four flat-faced segmental legs 57 serving as pole sections and connected by a bridge section 58. The provision of these four legs 57 provides firm adherence of the magnet 56 to a curved surface such as a pipe, preventing slippage. The bridge section 58 abuts the outer face of the housing wall 53 and is firmly affixed thereto by a bolt 59 provided with a mating nut 61. The bolt 59 extends through a stud-shaped assembly of disks of heat-insulating material 55 which serves to protect the sensitive sound pick-up components, as will be presently explained.

Located in the housing 52 and spaced from the walls thereof is a sound-to-electrical signal transducer 60, advantageously a standard crystal type photograph pickup, as illustrated, in which the crystal element is housed in a metal casing. The transducer 50 is provided in the conventional manner with a needle-receiving drive armature (not shown), and is supported in the housing 52 by a drive member 62 preferably in the form of an L-shaped strip of resilient material having good sound transmitting properties and having the free end of one leg firmly engaged and locked between the nut 61 and the wide flat portion of the heat insulating material which abuts the inner face of the housing wall 53. The free end of the other leg of drive member 62 is secured to the armature of the transducer 60. The drive member 62 is thus rigidly affixed to the rear wall 53 of housing 52, while the insulating material 55 isolates the mounting screw 59 and prevents any heat generated by the tested section 54 from reaching the transducer 60. Mounted on an end face of the housing 52 is a two terminal socket member 64, the terminals of which are connected by a double lead wire 63 to the output terminals of the transducer 60. Each of the pickups 51 is connected to a corresponding socket 43 by a long, preferably coaxial cable 66 provided at opposite ends with plugs or jacks which engage respective pairs of sockets 43 and 64, as shown in FIG. 1.

It will be appreciated that the L-shaped drive member 62 supports the transducer 60 in cantelever fashion, so that the transducer is in effect "floating" within the housing 52. Sound waves emitted by the member being tested are transmitted through the magnet 56 and housing 52 to the drive member 62 and the connected transducer crystal, causing responsive vibration thereof. The floating housing of transducer 60, however, is subject to inertia, and the relative movement of the drive member 62 and the transducer housing at opposite ends of the crystal, causes the latter to convert the aforementioned sound waves into electrical impulses which are fed through cable 66 to the amplifier circuit. To prevent the reception and amplification of ambient sound waves which may mask the sound waves received directly, the housing 52 may be filled with a sound-insulating material 65 such as polyurethane foam. Alternately, a vacuum may be produced within the housing 52.

One or more of the pickup members which may be employed with the present apparatus for reaching and sensing areas which are not easily or normally accessible to the pickups 51 may be of the type illustrated in FIG. 5 of the drawing and differs from the pickup 51 in that an elongated probe is substituted for the magnet 56. Specifically, the pickup 67 includes a housing 68 which supports a socket 69 and in which a transducer 75 is located. The transducer 75 is also of the conventional crystal type of different design than the transducer 60. There is provided an elongated, preferably metal, probe 70, pointed at its leading end 71 and provided at its trailing end with a coaxial threaded shank 72 of reduced transverse cross-section. The shank 72 registers with an opening formed in the bottom wall 73 of the housing 68 and carries washers located adjacent opposite faces of the wall 73. The shank 70 is rigidly affixed to the wall 73 by a nut 74 which engages the shank 72. A U-shaped flexible coupling drive member 76, corresponding to the drive member 63, connects the transducer 75 to the probe 70 and supports the transducer within the housing 68. The transducer is connected by leads 79 to the socket 69 mounted on the housing 68 which socket is engaged by a plug at one end of a cable, the other end of the cable being provided with a plug which engages a respective socket 43. A mechanical sonic coupling between the transducer of the pickup 67 and a section 78 of the equipment under test is effected merely by engaging the surface of the section 78 with the probe tip 71. A filling of sound-insulating material 80 may again be provided in housing 68.

By critical selection of the crystals, drive members and other component parts of the pick-ups 51 and 67, all of the pick-ups are matched to the amplifier and to each other. Each is, therefore, equally capable of converting the sound originating directly at its location into a precise amplified audible or visual signal, so that two or more pickups located at different points on a machine or system can provide an accurate comparison of sound conditions at the two points.

Considering now the general application and operation of the apparatus described above, a plurality of pickups 51 are mounted in different sections of the equipment under test by means of the respective magnets 56 and are each connected to the socket 43 by means of cables 66. The equipment sections receiving the pickups 51 are those providing the most informative sound patterns related to the functioning of the equipment and depend on the type of equipment under test and the nature of the malfunctioning and are readily determined by one skilled in the art. A set of earphones 46 is coupled to the apparatus by way of a socket 47 and the amplifier energized by closing the switch S1, and the switch S3 is thrown to the position shown in FIG. 6. The equipment under test is then brought to its operating state and the optimum tone and volume of the sound output of the earphones 46 are effected by adjusting the potentiometer P and the switch S4. The operator, while listening in on the earphones 46 and observing the sound level on the meter M, manipulates the switch S2 to successively connect differently located individual pickups 51 to the amplifier input. He is thus capable of accurately comparing with high resolution the sound patterns and over-all sound intensities at different parts of the equipment which information enables him to identify and isolate any defect or cause or source of malfunctioning in the equipment. A greater resolution and thus more informative data may be obtainable by a complete analysis of the various wave forms and these may be obtained by means of an oscilloscope, recording oscillograph or the like whose input is connected to the binding posts 49. In the same manner, the input of a tape recorder may be connected to the binding posts 49, and comparative sound waves recorded on tape for subsequent analysis in a laboratory or the like. Where a critical sensing area of the equipment under test is unaccessible with the pickup 51, the probe type pickup 67 may be coupled to one of the sockets 43 and employed in the manner described above.

FIG. 1 shows by way of example, two pickups 51 magnetically coupled to sections 54 which may be cylinders of a hydraulic lift. Defects in such hydraulic lift systems often occur when a burr on the inner surface of one cylinder causes the piston to flap away in passing, and the hydraulic fluid to flow around the piston. While such defect may be suspected from improper performance of the system, isolation of its location has been difficult, if not impossible. Assuming that such condition exists in one of the cylinders 54 shown in FIG. 1, the pickups 51 can be utilized to locate the source of the malfunction. With the pickups coupled to the two cylinders as shown, and the operator listening on the earphones 46, the knob 50 of selector switch S2 is turned back and forth to connect each pickup 51 alternately and successively to the amplifier input. By comparison of the two sounds, the operator should be readily able to detect the sound of the malfunction, and thus identify the defective cylinder. By means of the magnet 56, the pickup 51 may now be slid progressively over the surface of the defective cylinder, with the comparison switching continued at each location, until the precise position of the defect is located. Since each of the magnets 56 not only acts as a mechanical coupling means but as the sound sensor or audio coupling as well, the sound detected by the pickup is restricted to that eminating from the area directly beneath the magnet, and each pickup is, therefore, capable of isolating sound sources to a high degree.

Where a team of inspectors is testing a piece of equipment, each member of the team is provided with a pair of earphones 46 connected to the amplifier output. Communication between the members of the team is readily effected by reversing the switch S3 from the position shown in FIG. 6 to thereby decouple the pickups 51 and 67 from the amplifier input and coupling the microphones 45 thereto. In this manner, the inspector at the control panel can instruct an operator at a remote location regarding placement and movement of the pick-ups for optimum comparison determination. The apparatus thus assumes the role of an intercommunication system between the team members using the microphones and earphones 45 and 46. The apparatus is returned to its test state by reversing the switch S3 to its original position as shown in FIG. 6. The condition of the battery B is determined by merely momentarily closing the switch S5 with the switch S1 open and the reading on the meter M is an indication of the condition of the battery B.

In order to store or transport the apparatus 10, the various pickups, microphones, earphones and accessories are detached and uncoupled and placed in the storage space 28 through the rear opening thereto and the lid 34 is then closed. The pickup members 51 may be stored in this manner by merely applying their magnets 56 to the metal walls of the storage space 28.

The apparatus described herein may be employed in picking up and comparing the opening and closing of drift valves and other types of automatic valves, detecting and amplifying the sound of dirt particles in oil surrounding encased bearings, detecting the sound of springs expanding and contracting in brake drums, reproducing other sounds heretofore incapable of isolation.

While there have been described and illustrated preferred embodiments of the present invention, it is apparent that numerous alterations, omissions and additions may be made without departing from the spirit and scope thereof.

What I claim is:

1. A test apparatus for the comparison of sound emitted at different areas of equipment under test, said apparatus comprising a control unit including an audio amplifier having an input and an output, a plurality of remote, individual audio pickup devices each comprising a coupling member for releasably mounting said pickup device on said equipment under test, a transducer element, and a flexible drive member mechanically coupling said transducer element and said coupling member with said coupling member also serving as a sensor to transmit sound waves from said equipment under test through said drive member to said transducer element, means including a manually-operable switch on said control unit for selective, alternate and successive coupling of said individual pickup devices to said amplifier input, and means for connecting earphones and a current meter across said amplifier output, whereby to provide audible and visual comparison of sound emitted at spaced points on said test equipment when said pickup devices are mounted respectively at said spaced points and said switch is manually manipulated to alternately and successively couple said pickup devices to said amplifier input.

2. A test apparatus according to claim 1 in which each pickup device also includes a housing containing said transducer element, and means securing said coupling member rigidly to said housing and to one end of said drive member, with said transducer mounted on the other end of said drive member and being otherwise unsupported.

3. A test apparatus according to claim 2 in which said housing is filled with sound-insulating material capable of shielding said transducer from abient sound waves.

4. A test apparatus according to claim 2 which also includes heat insulating material interposed between said drive member and said coupling member and housing for shielding said transducer element from heat emitted by the equipment under test.

5. A test apparatus according to claim 2 in which said coupling member comprises a permanent magnet.

6. A test apparatus according to claim 5 in which said magnet has four integral projecting legs serving as pole sections and arranged for non-slip magnetic coupling to a curved surface of said equipment to be tested.

7. A test apparatus according to claim 1 in which said control unit also includes terminal means adapted for connection to a microphone, and switch means for selective connection of said terminal means to the input of said audio amplifier.

8. A test apparatus according to claim 1 in which said control unit includes means for connecting an oscilloscope and tape recorder to the output of said audio amplifier.

9. A test apparatus according to claim 1 in which said control unit comprises a portable housing, a face panel releasably mounted on said housing and mounting said audio amplifier, manually-operable switch, and current meter, a power source battery within said control unit housing, and switch means connecting said battery to said amplifier.

10. A test apparatus according to claim 9 in which said manually operable switch is a multicontact rotary switch mounted on said face panel and including a selector arm connected to said amplifier input and a plurality of input terminals, said face plate having a plurality of sockets mounted thereon, each socket being connected to a respective treminal of said selector switch, each of said audio pickup devices having a connecting cable terminating in a plug sized for reception in one of said sockets.

References Cited

UNITED STATES PATENTS

| | | | |
|---|---|---|---|
| 1,725,872 | 8/1929 | Lawrence | 73—71.4 XR |
| 2,826,706 | 3/1958 | Sackett | 73—71.2 XR |
| 2,848,558 | 8/1958 | Poulton | 310—8.5 XR |
| 3,115,616 | 12/1963 | Parris | 73—71.4 XR |
| 3,146,360 | 8/1964 | Marshall | 310—8.9 XR |
| 3,254,528 | 6/1966 | Michael | 73—71.4 |

FOREIGN PATENTS 1,021,172  11/1952  France.

JAMES J. GILL, *Primary Examiner.*